United States Patent [19]

Marics

[11] Patent Number: 5,574,494
[45] Date of Patent: Nov. 12, 1996

[54] METHOD FOR AUTOMATICALLY NAVIGATING A COMPLEX STRUTURE AT AN INTERACTIVE USER STATION

[75] Inventor: Monica A. Marics, Boulder, Colo.

[73] Assignee: U.S. West Technologies, Inc., Boulder, Colo.

[21] Appl. No.: 252,495

[22] Filed: May 31, 1994

[51] Int. Cl.$^6$ .............................. H04N 5/44; H04N 5/445
[52] U.S. Cl. ............................ 348/13; 348/553; 348/570; 348/906
[58] Field of Search .............................. 348/13, 553, 563, 348/564, 569, 570, 673, 678, 679, 687, 719, 720, 731, 734, 732, 906; H04N 5/44, 5/445

[56] References Cited

U.S. PATENT DOCUMENTS

| | | | |
|---|---|---|---|
| 3,800,230 | 3/1974 | Marks et al. | 325/396 |
| 3,940,702 | 2/1976 | Yoshimura et al. | 325/464 |
| 4,002,985 | 1/1977 | Merrell | 325/455 |
| 4,158,816 | 6/1979 | Wine | 325/464 |
| 4,164,711 | 8/1979 | Steckler et al. | 325/464 |
| 4,495,654 | 1/1985 | Deiss | 455/151 |
| 4,593,414 | 6/1986 | Koyanagi | 455/186 |
| 4,603,438 | 7/1986 | Filliman | 455/166 |
| 4,626,892 | 12/1986 | Nortrup et al. | 348/553 |
| 4,763,195 | 8/1988 | Tults | 358/193.1 |
| 4,870,492 | 9/1989 | Hakamada et al. | 358/193.1 |
| 5,068,734 | 11/1991 | Beery | 348/570 |
| 5,173,778 | 12/1992 | Sasaki et al. | 348/553 |
| 5,276,518 | 1/1994 | Shimizu | 358/191.1 |
| 5,317,403 | 5/1994 | Keenan | 455/186.1 |

FOREIGN PATENT DOCUMENTS 4129571  11/1993  Germany .

*Primary Examiner*—John K. Peng
*Assistant Examiner*—Glenton B. Burgess
*Attorney, Agent, or Firm*—Brooks & Kushman, P.C.

[57] ABSTRACT

A user station for navigating a visual menu structure includes a processor in electrical communication with a memory and a presentation device. In operation, the processor receives a first electrical signal generated by a user selection device. The signal corresponds to the user's request to store a selected node and a corresponding presentation element desired for future viewing. A second electrical signal generated by the user selection device is received at the processor and compared to the stored location information so as to locate the selected presentation element. The presentation element is thereafter automatically displayed for the user.

12 Claims, 4 Drawing Sheets

METHOD FOR AUTOMATICALLY NAVIGATING A COMPLEX STRUTURE AT AN INTERACTIVE USER STATION

TECHNICAL FIELD

This invention relates generally to methods for processing and presenting information. In particular, this invention relates to a method for automatically navigating a complex structure at an interactive user station.

BACKGROUND ART

Memory keys or "buttons" have long been incorporated into consumer radio and analog television products in order to provide users the ability to store transmission frequencies and broadcast channels which are desired for future tuning. See, for example, U.S. Pat. No. 4,870,492 issued to Hakamada et al., U.S. Pat. No. 4,603,438 issued to Filoiman, U.S. Pat. No. 4,495,654 issued to Deiss, U.S. Pat. No. 4,164,711 issued to Steckler et al., U.S. Pat. No. 4,158,186 issued to Wine and U.S. Pat. No. 4,002,985 issued to Merrell.

Each of the above patents broadly discloses means for a TV tuner to automatically skip selected analog TV broadcast channels either because a station does not exist at that frequency, or because the user has indicated that she is not interested in viewing the channel. See also U.S. Pat. No. 3,800,230 issued to Marks et al. and U.S. Pat. No. 4,593,414 issued to Koyanahei which disclose means for automatically tuning to channels at predefined times. Still further, U.S. Pat. No. 4,763,195 issued to Tults and U.S. Pat. No. 3,940,702 issued to Yoshimura et al. disclose means for automatically tuning only to channels where TV broadcast signals exist. Finally, U.S. Pat. No. 5,276,518 issued to Shimizu discloses means for providing additional memory such that channel settings may be tested at the factory and re-set for the field.

Recent advances in information processing and distribution generally referred to by the trade as the "Information Highway" have resulted in the increased availability of so-called "digital" television channels which have a multitude of applications which may be selected by the user. These applications are generally organized in a hierarchical structure of visual menu screens and corresponding presentation elements all of which must be physically navigated by the user through consecutive menu selections in order to obtain the desired application.

Consider, for example, a digital channel such as that shown in FIG. 1 wherein the main menu identifies entertainment applications for "dining", "shopping", "calendar", "tours", "attractions" and "nightlife". As shown, if the user desires to obtain the restaurant hours of a selected Mandarin chinese restaurant, ten screen selections must be made before arriving at the desired application. This physical manipulation requires significant user effort and time as well as memory to navigate. For example, assume that each selection requires ten seconds for the user to view the screen, decide on an action, make a selection, and have the system change to the next screen. It would take over 90 seconds for the user to navigate to the fifth screen of a six level menu structure.

While the above references broadly disclose means for storing selected radio frequencies or channels in analog broadcast television, none teach or suggest means for automatically navigating a complex structure such as a visual menu structure on a digital television channel.

Consequently, a need exists for a method of storing in memory and automatically tuning to selected presentation elements of a complex structure such as applications of a visual menu structure found on a digital television channel. Such a method must be operative to reduce the amount of user effort, memory and time necessary to navigate the complex structure. Moreover, such a method should permit stored information to be easily retrieved through a user selection device such as, for example, a remote control. Still further, such a method should permit user broadcast preferences such as volume, color contrast, screen display size, etc. to be stored along with the storage locations of corresponding applications for future automatic retrieval and display.

DISCLOSURE OF THE INVENTION

It is a general object of the present invention to provide a method for automatically navigating a complex structure at an interactive user station such as, for example, a visual menu structure on a digital television channel.

Yet another object of the invention is the provision of a method of the type referenced above which is operative to automatically tune to selected presentation elements or applications in accordance with corresponding predetermined broadcast preferences.

In carrying out these and other objects, features and advantages of the present invention, a method is provided for automatically navigating a complex structure at an interactive user station wherein the complex structure comprises a plurality of nodes each of what includes at least one presentation element. When used in cooperation with a television, a remote control and a Set Top Terminal (STT), the disclosed method is operative to automatically navigate to a selected application of a visual menu structure on a digital television channel.

The method herein disclosed requires a processor in electrical communication with a memory and the presentation device. When used with a television as the presentation device, the processor and memory may both be included in the STT. In operation, a user selection device, such as a remote control, is adapted to generate a first electrical signal which is directed for receipt by the processor. This signal corresponds to the location of a selected node and corresponding presentation element, i.e. a selected visual menu and corresponding application which is desired for future viewing. This information is directed to be stored in memory.

The user selection device is further adapted to generate a second electrical signal which corresponds to the stored location of a selected presentation element. Following receipt and comparison of this information to the stored location information, the presentation device is adapted to automatically present the selected presentation element for user viewing.

The method disclosed herein may further be adapted to store corresponding user broadcast preferences desired for future viewing of the selected presentation element. In operation, the presentation device is thus also operative to not only tune to the selected presentation element, but to do so in accordance with selected broadcast preferences.

BRIEF DESCRIPTION OF THE DRAWINGS

The foregoing aspects and many of the attendant advantages of this invention will become more readily appreciated as the same become better understood by reference to the following best modes for carrying out the invention, when taken in conjunction with the accompanying drawings wherein like reference numerals correspond to like components and wherein.

BEST MODES FOR CARRYING OUT THE INVENTION

Figures 2, 3:
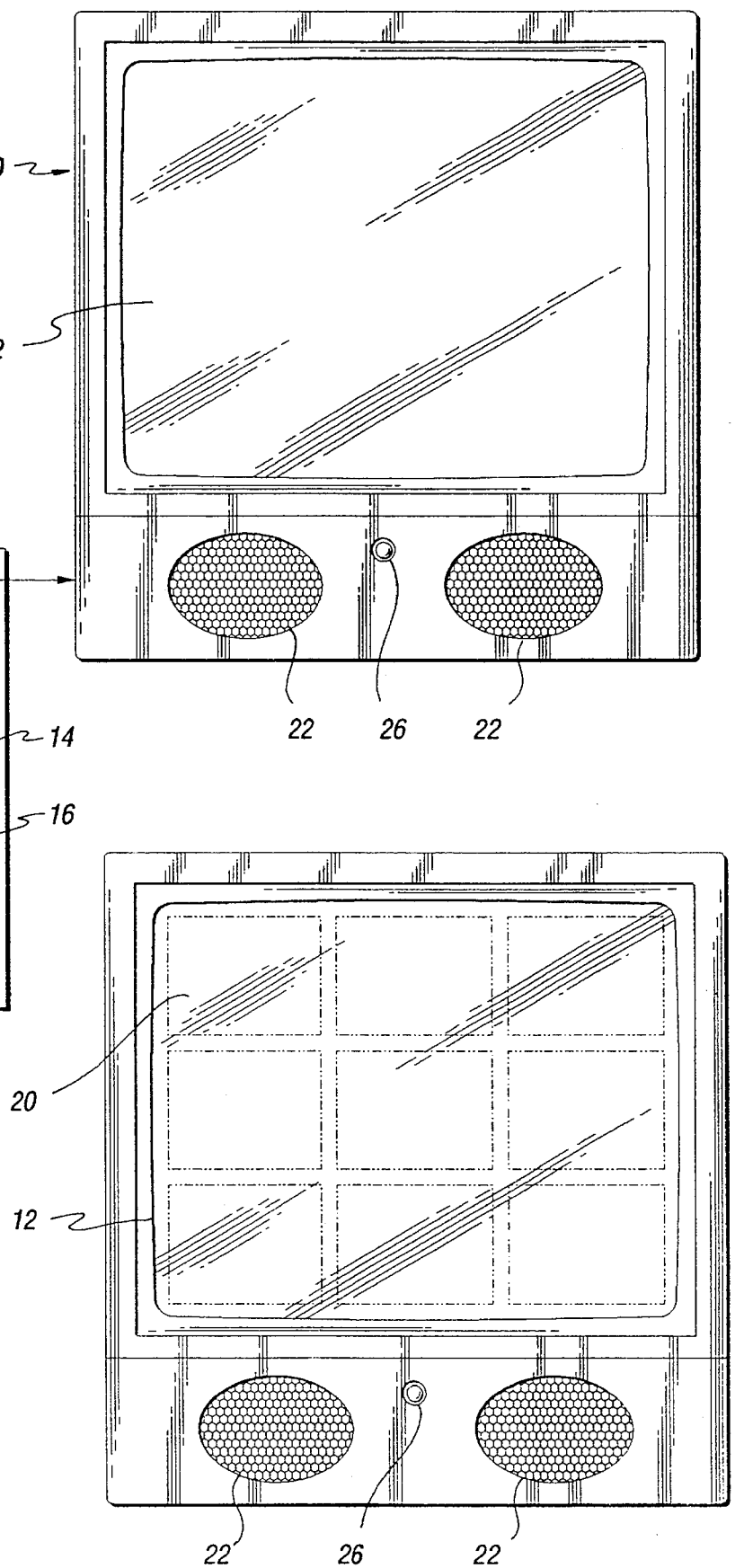
FIG. 2 is a schematic diagram of an interactive user station adapted for use with the present invention.
FIG. 3 is a schematic diagram of an interactive user station adapted for use with the present invention having an alternative display area.

Referring to the drawings, FIG. 2 illustrates a schematic diagram of an interactive user station adapted for use with the present invention. The user station 10 may comprise, for example, a television, video monitor, Liquid Crystal Display (LCD) or any other suitable display means. User station 10 includes a display area 12 adapted to present textual, video and/or audio information. A processor 14 is further provided in electrical communication with user station 10 and a memory 16. As referenced above, processor 14 and memory 16 may be included in a Set Top Terminal (STT) 18 designed to be placed atop user station 10 and interface therewith like a cable box.

In a preferred embodiment, the display area 12 of user station 10 is a screen of a single video monitor. The screen may, however, be sub-divided into a plurality of presentation cells 20 adapted to provide textual information, complete video images or even portions of a complete image using a predetermined matrix as shown in FIG. 3. In an alternative embodiment, the display area could be a video wall, projector, or any other device adapted to display information.

Preferably, the user station 10 also includes speakers 22 for presenting audio information. The audio information may be used to accompany or supplement the video or technical information presented at the display area 12.

Figure 4:
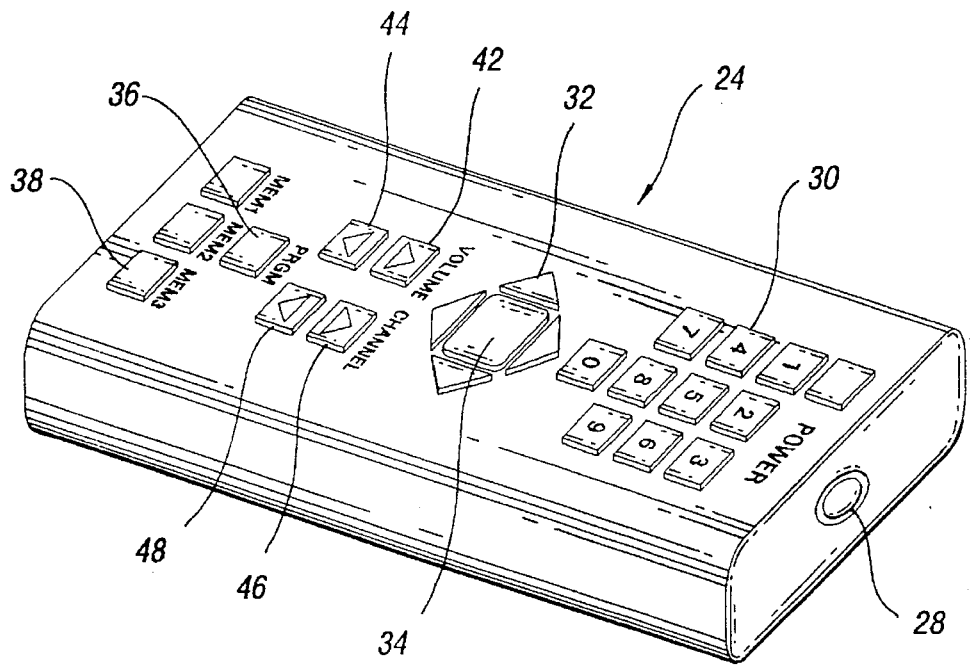
FIG. 4 is a schematic diagram of a preferred user selection device used in accordance with the present invention.

In addition, the user station 10 preferably includes a user selection device such as a pointing device or an interface to a pointing device as shown in FIG. 4 and referred to generally by reference numeral 24. The user station 10 of FIGS. 2–3 also includes a receiver such as receiver 26. The receiver 26 receives signals from an associated transmitter 28 incorporated in the user selection device 24. The receiver forms part of a hardware user interface and is connected to processor 14 within the user station 10 for communicating user commands thereto.

Referring still to FIG. 4, a typical user selection device such as an IR remote control 24 is shown. In accordance with the invention, however, any appropriate user selection device may be utilized including an RF remote control, wired remote control keyboard, etc., so long as the device is adapted to communicate with processor 14 within user station 10 for communicating user commands. Remote control 24 typically includes ten numerical keys or buttons 30, four cursor keys 32, a <select> button 34 operative for indicating the <program> mode to processor 16, a <program> key 36 and a plurality of <memory> buttons 38, i.e. <mem 1>, <mem 2>, <mem 3>, etc., each associated with various locations in memory. Remote control 24 also preferably includes a <power> button 40, <vol ↑> and <vol ↑>buttons 42 and 44 and <channel ↑> and <channel ↑>buttons 46 and 48.

Figure 1:
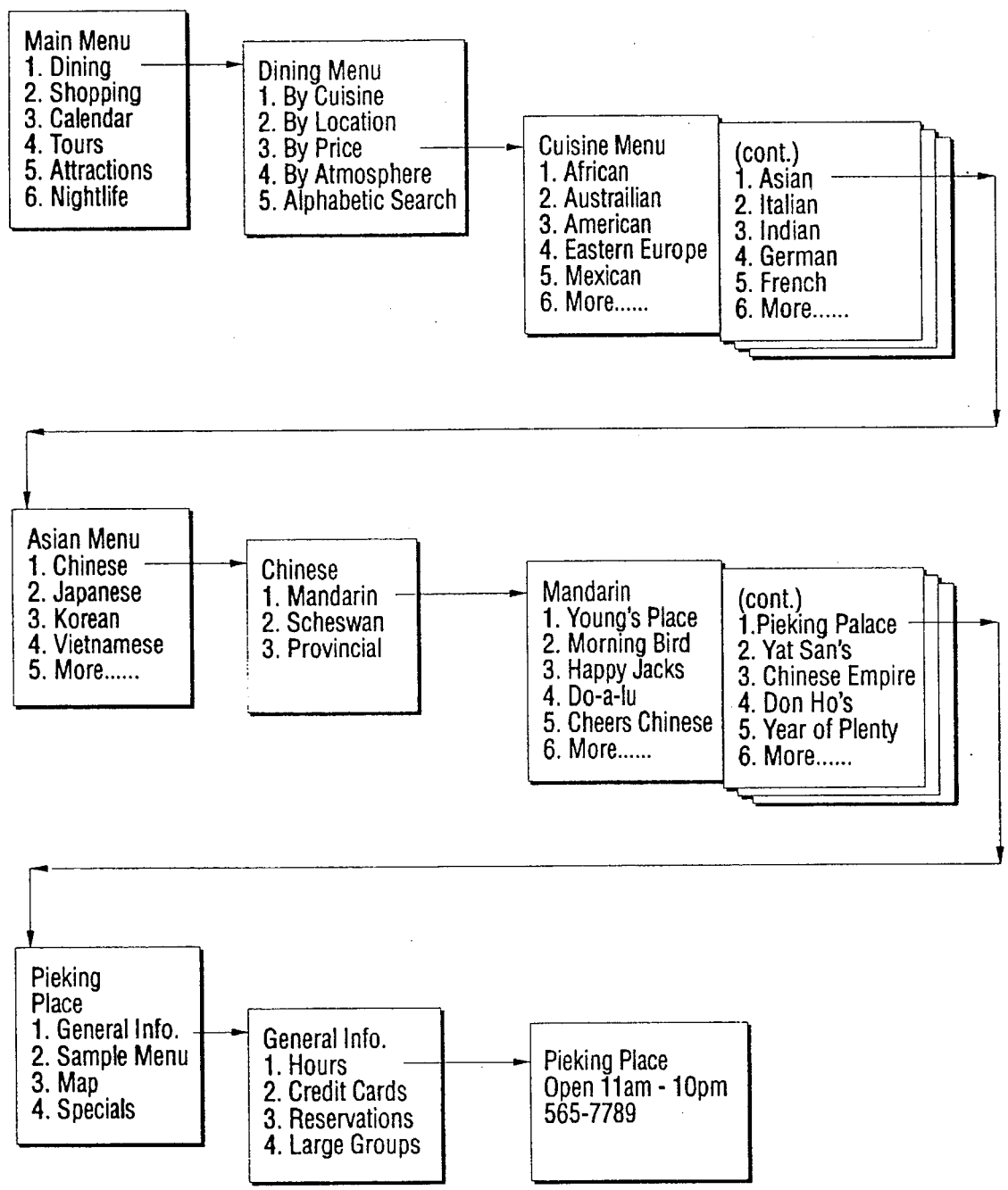
FIG. 1 is a schematic diagram of a visual menu structure which may be used on a typical digital television channel.
Figure 5:
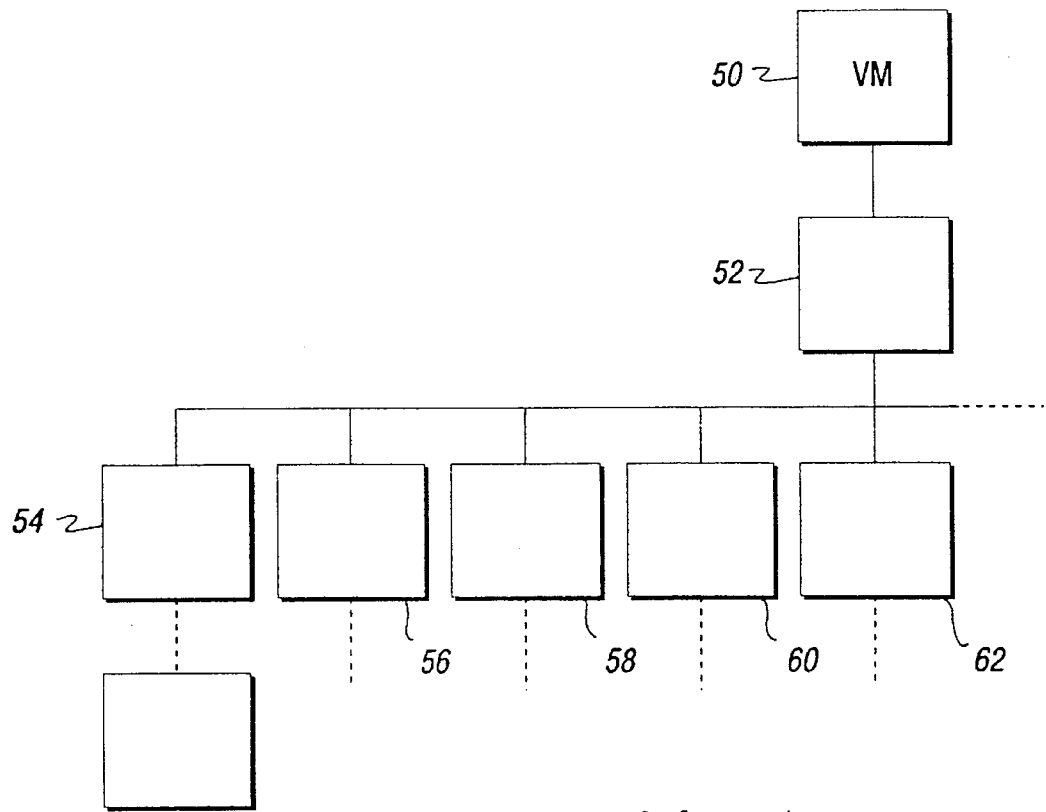
FIG. 5 is a block diagram representing a hierarchical structure of presentation elements.

Referring now to FIG. 5, there is shown a hierarchical structure of the nodes and corresponding presentation elements which may be navigated in accordance with the teachings of the present invention. For simplicity, the illustrated structure describes the relationship between nodes in an interactive user application such as the applications of a digital menu structure found in a digital television channel. It is understood, however, that the method of automatically navigating nodes and corresponding presentation elements of the present invention is applicable to any type of complex structure and is not limited to textual information searching such as shown in FIG. 1.

For example, the method of the present invention could easily be used to automatically navigate a complex structure which includes seller modules, visual menu segments and product segments for use in accordance with a screen display of the type shown in FIG. 3. Seller modules might be grouped segments pertaining to a specific seller, such as a department store. Visual menu segments may be used to organize the presentation and provide navigation through the structure. Visual menus may be further used to define the parent-child relationships between the nodes and corresponding presentation elements. For each node, product segments would permit users to perform functions based on the displayed product. Typical functions might include displaying features of the products, displaying product information, displaying instructional information and logging a sale of the product.

In such an application, each audio/visual element of a node would be displayed in at least one presentation cell 20 of display area 12. Each presentation cell would have associated behavior which is performed when the cell is selected by the user. This behavior association would conceptually be similar to a hypercard stack design, wherein each cell 20 would represent a button a user could press on remote control 24.

Referring still to FIG. 5, the method of navigating a complex structure of the present invention will be described in further detail. As shown, node 50 is a visual menu which is also operative as the root node of the structure. Node 50 may be an introductory node corresponding to, for example, the main menu of FIG. 1. The purpose of root node 50 would be to introduce the user to the available information services which may be navigated and stored for later automatic retrieval.

In operation, the user may begin navigating the structure by selecting any presentation element by cursor or other coded information. For example, node 52 may correspond to the dining menu in FIG. 1 and may have five corresponding presentation elements 54, 56, 58, 60 and 62 corresponding to "by cuisine", "by location", "by price", "by atmosphere" and "by alphabetic search". Each of these presentation elements is, in itself, operative as a node having its own corresponding presentation elements. For example, node 54, which corresponds to the "by cuisine price" presentation element of the "dining menu", may have numerous corresponding presentation elements such as "African" (node 63), "Australian", "American", "Eastern Europe", etc. (not shown) Each node may therefore be operative as both a node and a presentation element of a parent node.

Each node and corresponding presentation element of the hierarchical complex information structure disclosed may also have a corresponding code which may be stored in memory for later retrieval. In such case, the presentation element may be directly and automatically accessed by entering the appropriate code in the user selection device 24. In the alternative, the user may navigate the complex structure by using the cursor and <select> button and automatically store the node/presentation element location by performing a predetermined sequence of steps.

For example, with reference to FIG. 1, to store the navigational steps necessary to obtain the hours of the "Peking Place" restaurant, the user would be required to enter the following information consecutively at the remote control:

| USER ACTION | RESULT |
| --- | --- |
| Press 1 | Dining Menu Displayed |
| Press 1 | Cuisine Menu Displayed |
| Press 6 | Second Page of Menu Displayed |
| Press 1 | Asian Menu Displayed |
| Press 1 | Chinese Selections Displayed |
| Press 1 | Mandarin Selections Displayed |
| Press 6 | Second Page of Mandarin Listing Displayed |
| Press 1 | Peking Place Listing Displayed |
| Press 1 | General Information Listing for Peking Place Displayed |
| Press 1 | Hours of Peking Place Displayed |

At this point, the user would depress the <program> key 36 which is operative to place the set top box and display into the "program" mode. The user would then depress one of the <memory> keys 38 of user selection device 24 which is operative to generate an IR signal which would be received by the processor.

The processor would convert the location of the node "General Information" and its corresponding presentation element which are the "hours" of the Peking Place restaurant into digital format, by storing the node's location (e.g., 111) into memory 16. Alternatively, the user could initially depress the <program> 36 button without performing the above navigation steps in order to place the display into the "program" mode, depress numerical keys "111" and thereafter depress a selected memory key 38. As above, these steps would be operative to have the processor convert the location of the node "Cuisine Menu" and its corresponding presentation elements "African", "Australian", "American", etc. into digital format, and store the node's location and the corresponding IR signal from the <memory> key 38 of the user selection device 24 into memory 16. As readily seen, this alternative method of storing location information would only be advantageous if the user had knowledge of the corresponding coded information through reference to a manual or perhaps from previous experience. In the absence of such information, it would still be necessary for the user to scroll through the complex structure, here consecutive menu screens, and store the desired information once it is located.

When the user later desires to tune to a stored node and corresponding presentation element, the user simply depresses the corresponding <memory> key 38 on user selection device 24 which is operative to generate yet another IR signal. Again, this IR signal is directed for receipt by the processor 14 which will convert the same to digital information, retrieve the location of the corresponding node from memory, and automatically navigate to the same such that the presentation element will be displayed to the user.

Again, with reference to divisional menu structure of FIG. 1, if the "hours" screen for the Peking Place restaurant were stored in <memory> key 1 of user selection device 24, by depressing this same memory key, the user station would automatically navigate directly to this screen. Significantly, when the method of the present invention is used for navigating a visual menu structure of a digital television channel, it is further envisioned that the user need not be tuned to the digital channel at all times. Rather, the user could be watching analog television and could automatically navigate to the desired "hours" screen of the Peking Place restaurant by depressing <memory> key 1 of the user selection device 24 as referenced in the example above. The television screen would thereafter automatically tune to the digital channel and, in particular, the "hours" application.

Figure 6:
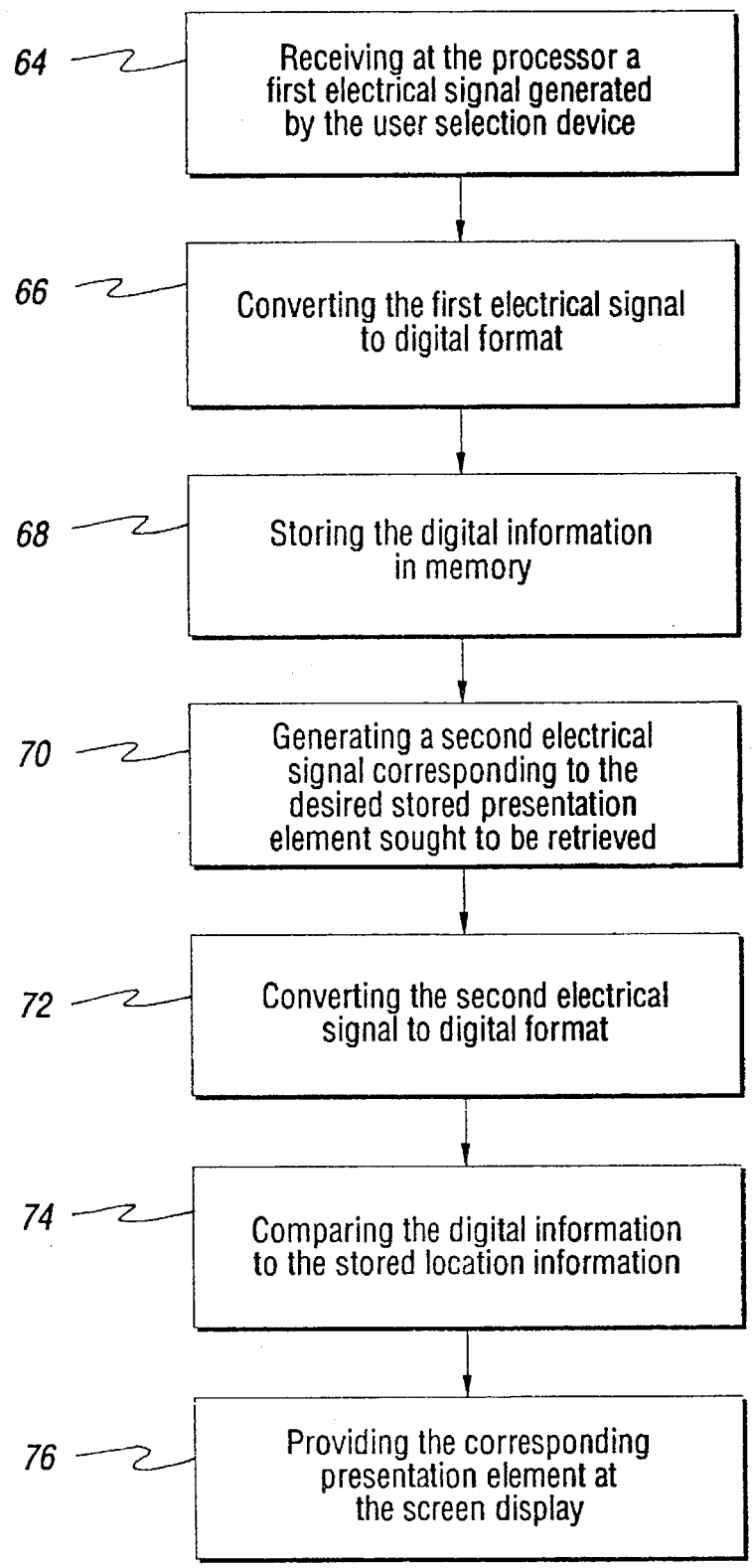
FIG. 6 is a block diagram of the method steps of the present invention.

With reference to FIG. 6 of the drawings, a more detailed block diagram is provided to illustrate the method steps of the present invention. As disclosed herein, the present invention is directed to a method for automatically navigating a complex structure at an interactive user station wherein the complex structure comprises a plurality of nodes each of which includes at least one presentation element. The user station includes a processor 14 in electrical communication with the memory 16 in a presentation device such as a television 10 as shown in FIG. 2. In FIG. 6, the method includes the steps of receiving 64 at the processor 14 a first electrical signal generated by the user selection device 24. This signal corresponds to a user request to store the location of the current node and associated electrical signal into memory.

Once received by the processor 14, the electrical signal is converted 66 to digital format and the information is stored 68 in memory 16. When a user later desires to automatically tune to a stored presentation element, a second electrical signal is generated 70 by the user selection device 24. Once received by the processor, this second electrical signal is converted 72, to digital information and compared 74 to the stored location information. When a match is located, the presentation element is provided 76 at the screen display or other suitable presentation element.

In an alternative embodiment referenced above, both the first and second electrical signals also include user broadcast preference information desired for future viewing of the selected presentation element. This broadcast preference information may include, for example, volume, color contrast, tint, vertical hold, horizontal hold and screen display size preferences. In operation, the selected presentation element may be stored in accordance with the broadcast preferences which then exist. In the alternative, the user may be prompted at screen display 12 to enter selected information regarding desired broadcast preferences for the presentation element being stored. When the presentation element is automatically retrieved for future viewing, it is retrieved in accordance with the corresponding user broadcast preferences identified at the time the location information is stored.

While the best modes for carrying out the invention have been described in detail, those familiar with the art to which this invention relates will recognize various alternative designs and embodiments for practicing the invention as defined by the following claims.

What is claimed is:

1. A method for automatically navigating a hierarchical complex structure at an interactive user station, the complex structure comprising a plurality of nodes, each node including at least one presentation element, the user station including a processor in electrical communication with a memory and a presentation device, the method comprising:

receiving at said processor a first electrical signal generated by a user selection device, said signal corresponding to a predetermined location of a selected node and a corresponding presentation element desired for future viewing, said location to be stored in said memory;

receiving at said processor a second electrical signal generated by said user selection device corresponding to said stored location of said selected presentation element; and automatically navigating to and presenting at said presentation device said selected presentation element.

2. The method of claim 1, wherein said presentation device is a television.

3. The method of claim 1, wherein said processor and said memory are included in a Set Top Terminal (STT).

4. The method of claim 1, wherein said user selection device is an IR remote control.

5. The method of claim 1, wherein said first electrical signal further includes user broadcast preferences desired for future viewing of said selected presentation element.

6. For use in cooperation with a television, a remote control and a Set Top Terminal (STT), a method for automatically navigating to a selected application of a visual menu structure on a digital television channel, said STT including a processor in electrical communication with a memory and said television, the method comprising:

receiving at said processor a first electrical signal generated by said remote control, said signal corresponding to (a) the location of a selected application, and (b) user broadcast preferences desired for future viewing of said selected application, said location and broadcast information to be stored in said memory;

receiving at said processor a second electrical signal generated by said remote control corresponding to said stored location and broadcast preferences of said selected application; and automatically tuning said television to said selected application in accordance with said stored broadcast preferences.

7. The method of claim 6, wherein said broadcast preferences include volume, color contrast, tint, vertical hold, horizontal hold or screen display size.

8. The method of claim 6, wherein said remote control further includes a <program> key operative to place said remote control in a <program> mode when depressed.

9. The method of claim 8, wherein said remote control includes a <memory> key operative to (a) generate said first electrical signal when said remote control is in a <program> mode, and (b) generate said second electrical signal when said remote control is in a <tuning> mode.

10. The method of claim 6, wherein each of said digital channel applications is assigned a corresponding code which, when entered at said remote control, is operative to generate said second electrical signal.

11. The method of claim 6, wherein the step of receiving said first electrical signal further includes the step of converting said signal to digital information and storing said location and broadcast preference information in said memory.

12. The method of claim 6, wherein the step of receiving said second electrical signal further includes the steps of (a) converting said signal to digital information, and (b) comparing said digital information to said stored location and broadcast preference information.

* * * * *